(12) United States Patent
Thorsen

(10) Patent No.: US 12,114,703 B2
(45) Date of Patent: Oct. 15, 2024

(54) AEROSOL PROVISION DEVICE

(71) Applicant: Nicoventures Trading Limited, London (GB)

(72) Inventor: Mitchel Thorsen, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 394 days.

(21) Appl. No.: 17/438,270

(22) PCT Filed: Mar. 9, 2020

(86) PCT No.: PCT/EP2020/056252
§ 371 (c)(1),
(2) Date: Sep. 10, 2021

(87) PCT Pub. No.: WO2020/182759
PCT Pub. Date: Sep. 17, 2020

(65) Prior Publication Data
US 2022/0142254 A1   May 12, 2022

Related U.S. Application Data

(60) Provisional application No. 62/816,316, filed on Mar. 11, 2019.

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/70* (2020.01);
(Continued)

(58) Field of Classification Search
CPC ............................. A24F 40/465; H01E 41/06
See application file for complete search history.

(56) References Cited

U.S. PATENT DOCUMENTS 5,461,772 A * 10/1995 Puri ..................... H01F 41/127
427/116
9,717,277 B2 * 8/2017 Mironov ................ H05B 6/108
(Continued)

FOREIGN PATENT DOCUMENTS

| CN | 105307526 A | 2/2016 |
| CN | 107735844 A | 2/2018 |

(Continued)

OTHER PUBLICATIONS

International Search Report and Written Opinion for International Application No. PCT/EP2020/056252, dated Jun. 9, 2020, 12 pages.
(Continued)

*Primary Examiner* — Neil Abrams
(74) *Attorney, Agent, or Firm* — Husch Blackwell

(57) ABSTRACT

A method of forming an aerosol provision device inductor coil comprises providing a litz wire comprising a plurality of wire strands, wherein each of the plurality of wire strands comprise a bondable coating. The method further comprises forming an inductor coil from the litz wire on a support member, wherein the inductor coil has a predetermined shape. The method further comprises activating the bondable coating such that the inductor coil substantially retains the predetermined shape, and removing the inductor coil from the support member.

16 Claims, 10 Drawing Sheets

(51) Int. Cl.
  *A24F 40/70* (2020.01)
  *H01F 27/28* (2006.01)
  *H01F 41/06* (2016.01)
  *H05B 6/10* (2006.01)
  *H05B 6/36* (2006.01)
  *B23K 1/08* (2006.01)
  *B23K 101/36* (2006.01)

(52) U.S. Cl.
  CPC ......... *H01F 27/2823* (2013.01); *H01F 41/06* (2013.01); *H05B 6/105* (2013.01); *H05B 6/36* (2013.01); *B23K 1/08* (2013.01); *B23K 2101/36* (2018.08)

(56) References Cited

U.S. PATENT DOCUMENTS

| | | | |
|---|---|---|---|
| 9,842,681 | B2 | 12/2017 | Hasegawa et al. |
| 10,028,533 | B2* | 7/2018 | Fursa .................... A24F 40/465 |
| 11,277,884 | B2* | 3/2022 | Stura ........................ A24F 40/50 |
| 2002/0086158 | A1* | 7/2002 | Stubler ..................... E04C 5/08 428/375 |
| 2008/0149621 | A1 | 6/2008 | Kanou et al. |
| 2013/0278269 | A1 | 10/2013 | Steck et al. |
| 2016/0076250 | A1* | 3/2016 | Oshima ..................... E04C 5/01 428/377 |
| 2019/0313695 | A1* | 10/2019 | Kaufman ............... H05B 6/365 |
| 2022/0183376 | A1* | 6/2022 | Blandino .............. A24F 40/465 |

FOREIGN PATENT DOCUMENTS

| | | |
|---|---|---|
| CN | 109068729 A | 12/2018 |
| CN | 109588780 A | 4/2019 |
| CN | 109637771 A | 4/2019 |
| EP | 3506721 A1 | 7/2019 |
| JP | S58181554 A | 10/1983 |
| JP | S60130091 A | 7/1985 |
| JP | H0676931 A | 3/1994 |
| JP | H0864413 A | 3/1996 |
| JP | 2003168618 A | 6/2003 |
| JP | 2003284638 A | 10/2003 |
| JP | 2005085560 A | 3/2005 |
| JP | 2007227035 A | 9/2007 |
| JP | 2009048916 A | 3/2009 |
| JP | 2014183252 A | 9/2014 |
| JP | 2014216395 A | 11/2014 |
| JP | 2016528874 A | 9/2016 |
| RU | 2364001 C2 | 8/2009 |
| RU | 2015148609 A | 5/2017 |
| RU | 2649413 C1 | 4/2018 |
| WO | 2013136396 A1 | 9/2013 |
| WO | WO 2015/177253 A1 | 11/2015 |
| WO | 2016199893 A1 | 12/2016 |
| WO | 2017068094 A1 | 4/2017 |
| WO | WO 2018/073376 A1 | 4/2018 |
| WO | 2018211084 A1 | 11/2018 |
| WO | 2019053268 A1 | 3/2019 |

OTHER PUBLICATIONS

"International Preliminary Report on Patentability received for PCT Patent Application No. PCT/EP2020/056252, mailed on Sep. 23, 2021", 8 pages.

"International Preliminary Report on Patentability received for PCT Patent Application No. PCT/EP2020/064654, mailed on Dec. 9, 2021", 14 pages.

"International Search Report and Written Opinion received for PCT Patent Application No. PCT/EP2020/064654, mailed on Nov. 26, 2020", 19 pages.

"Invitation to Pay Additional Fees received for PCT Patent Application No. PCT/EP2020/064654, mailed on Sep. 14, 2020", 13 pages.

* cited by examiner

AEROSOL PROVISION DEVICE

CROSS-REFERENCE TO RELATED APPLICATIONS

This application is a National Phase entry of PCT Application No. PCT/EP2020/056252, filed Mar. 9, 2020, which application claims the benefit of priority to U.S. Provisional Application No. 62/816,316, filed Mar. 11, 2019, the entire disclosures of which are incorporated herein by reference.

TECHNICAL FIELD

The present disclosure relates to a method of forming an inductor coil for an aerosol provision device, and an aerosol provision device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided a method of forming an aerosol provision device inductor coil, the method comprising:
  providing a litz wire comprising a plurality of wire strands, wherein each of the plurality of wire strands comprise a bondable coating;
  forming an inductor coil from the litz wire on a support member, wherein the inductor coil has a predetermined shape;
  activating the bondable coating such that the inductor coil substantially retains the predetermined shape; and
  removing the inductor coil from the support member.

According to a second aspect of the present disclosure, there is provided an aerosol provision device induction coil formed from a litz wire comprising a plurality of wire strands, each of the wire strands having a bondable coating, wherein the bondable coating has been activated such that the aerosol provision device induction coil substantially retains its own shape in the absence of a support member.

Further features and advantages of the invention will become apparent from the following description of preferred embodiments of the invention, given by way of example only, which is made with reference to the accompanying drawings.

DETAILED DESCRIPTION

Figure 1:
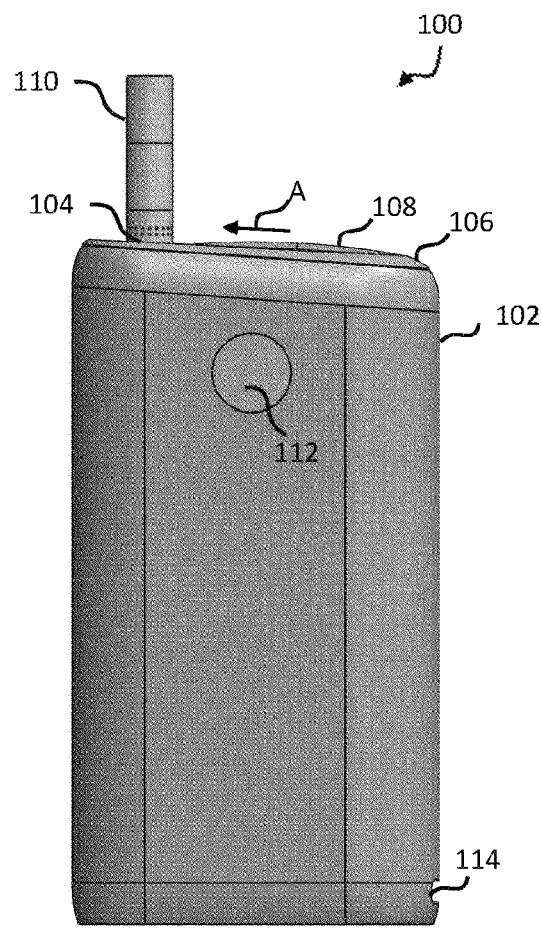
FIG. 1 shows a front view of an example of an aerosol provision device.

As used herein, the term "aerosol generating material" includes materials that provide volatilised components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatus is known that heats aerosol generating material to volatilise at least one component of the aerosol generating material, typically to form an aerosol which can be inhaled, without burning or combusting the aerosol generating material. Such apparatus is sometimes described as an "aerosol generating device", an "aerosol provision device", a "heat-not-burn device", a "tobacco heating product device" or a "tobacco heating device" or similar. Similarly, there are also so-called e-cigarette devices, which typically vaporise an aerosol generating material in the form of a liquid, which may or may not contain nicotine. The aerosol generating material may be in the form of or be provided as part of a rod, cartridge or cassette or the like which can be inserted into the apparatus. A heater for heating and volatilising the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilise the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines a method of forming an inductor coil for use in an aerosol provision device. The method starts with a litz wire/cable. A litz wire is a wire comprising a plurality of wire strands and is used to carry alternating current. Litz wire is used to reduce skin effect losses in a conductor, and comprises a plurality of individually insulated wires which are twisted or woven together. The result of this winding is to equalize the proportion of the overall length over which each strand is at the outside of the conductor. This has the effect of distributing alternating current equally among the wire strands, reducing the resistance in the wire. In some examples the litz wire comprises several bundles of wire strands, where the wire strands in each bundle are twisted together. The bundles of wires are twisted/woven together in a similar way.

In the present disclosure, each of the plurality of wire strands comprises a bondable coating. A bondable coating is a coating which surrounds each wire strand, and which can be activated (such as via heating), so that the strands within the litz wire bond to one more neighbouring strands. The bondable coating allows the litz wire to be formed into the shape of an inductor coil on a support member, and after the bondable coating is activated, the inductor coil will retain its shape. The bondable coating therefore "sets" the shape of the inductor coil. In some examples, the bondable coating is the electrically insulating layer which surrounds the conductive core. However, the bondable coating and the insulation may be separate layers, and the bondable coating surrounds the insulating layer. In an example, the conductive core of the litz wire comprises copper.

The litz wire (now in the shape of the inductor coil) can be removed from the support member without losing its shape. The support member is a structure which is used to form the litz wire into a predetermined shape (e.g., the shape of the inductor coil). The support member thus holds the litz wire in the predetermined shape when the bondable coating is activated.

The example method therefore provides an inductor coil that is more likely to retain its shape over time. Thus, after the device has been assembled, the desired heating effect can be maintained for longer, which increases the lifetime of the device, and ensures that the inductor coil is operating most efficiently. This is in contrast to devices with inductor coils that can deform or warp over time. The method also provides more flexibility during manufacture of the device. For example, the inductor coils can be prepared in advance of the assembly process, rather than at the time the device is assembled.

The above method can be used to form inductor coils for use in aerosol provision devices. In some examples, the device may comprise two or more inductor coils. Each inductor coil is arranged to generate a varying magnetic field, which penetrates a susceptor. As will be discussed in more detail herein, the susceptor is an electrically conducting object, which is heatable by varying magnetic fields. An article comprising aerosol generating material can be received within the susceptor, or be arranged near to, or in contact with the susceptor. Once heated, the susceptor transfers heat to the aerosol generating material, which releases aerosol.

In a particular example, forming the inductor coil comprises winding the litz wire around the support member thereby to form a helical inductor coil. Thus, the inductor coil may have a helical shape. For example, the support member may be tubular or cylindrical, and the litz wire can be wound/wrapped around the support member into the predetermined helical shape. The support member may therefore have an outer cross-section which defines the predetermined shape. For example, the support member may have a first outer cross section and the helical coil may have a second inner cross section, where the first outer cross section and the second inner cross section are substantially the same. The first and second cross sections may be circular in shape, for example. By winding the litz wire around the support member, and along the length of the support member, the helical inductor coil can be formed.

The method may further comprise, after removing the inductor coil from the support member, receiving the inductor coil on an insulating member/support. The insulating member may be a component that is arranged within the aerosol provision device, for example. The insulating member may have a third outer cross section that is substantially equal to the first outer cross section.

In other examples, the inductor coil may have a flat shape, a curved shape, or may be shaped like a hyperbolic paraboloid.

The predetermined shape may include a connection portion at one or more ends of the inductor coil, for connecting the inductor coil to a source of electric power. In other words, at least one end of the inductor coil and the litz wire may define a connection portion. There may be a connection portion at each end of the inductor coil. The connection portion(s) may be connectable to circuitry, such as a printed circuit board (PCB), for example. The method may comprise dipping the connection portion into solder for a period of time. The molten solder acts to melt or otherwise remove the insulation from the plurality of wire strands, and to create good electrical contact between each of the wire strands and the component to which the inductor coil is connected. Thus, in the connection portion, each (or a majority) of the wire strands are electrically connected to each other via the solder which adheres/bonds to the inductor coil. The connector portion comprises part of the inductor coil which is connected to the source of electric power (such as the ends).

The period of time the connection portion is dipped into solder may be between about 2 seconds and about 6 seconds, or between about 3 seconds and about 5 seconds, for example. It has been found that this length of time provides a good balance between removing the insulation (and bondable coating) from the wire strands and creating a good electrical connection, without damaging the conductive cores of the wire strands. Preferably, the period of time is between about 4 seconds and about 5 seconds. This provides a good balance between the above-mentioned considerations.

The solder into which the connection portion is dipped may have a temperature of between about 400° C. and about 500° C., or between about 400° C. and about 450° C. It has been found that solder of this temperature is suitable to remove the insulation (and bondable coating) from the wire strands, without damaging the conductive cores of the wire strands. Preferably, the solder may have a temperature about 450° C.

Activating the bondable coating may comprise heating the bondable coating. For example, after the inductor coil has been formed on the support member, the litz wire can be heated to cause the bondable coating on each of the wire strands to self-bond such that the inductor coil undergoes thermosetting. In a particular example, heating the bondable coating comprises heating the bondable coating to a bonding temperature of between about 180 and 200° C.

In another example, the bondable coating may be activated via a solvent.

The method may further comprise cooling the inductor coil after activating the bondable coating. This process can cause the bondable coating to cool, thus setting the shape of the inductor coil. Cooling the inductor coil may comprise passing air over the inductor coil. An air gun or fan, for example, can blow air over the inductor coil. Using an air gun or fan can speed up the cooling process.

As mentioned above, the inductor coil may comprise two connection portions, one arranged towards each end of the inductor coil. In one example, the predetermined shape comprises two connection portions, both of which lie in substantially the same plane, and wherein forming the inductor coil comprises bending at least one of the connection portions such that it lies in the plane. For example, the two ends of the inductor coil may lie on an axis that is parallel to an axis defined by the inductor coils (which is also parallel to a longitudinal axis of the susceptor in an assembled aerosol provision device). The plane may be arranged such that it is arranged tangentially to inductor coil.

Bending at least one of the connection portions may comprise bending by about 90 degrees. In a particular example, a first connection portion extends tangentially from the helically wound inductor coil, and a second connection portion is bent by about 90 degrees from the tangential direction such that it lies in the same plane as the first connection portion. The second portion may initially extend tangentially from the inductor coil before it is bent.

Winding the litz wire may comprise winding the litz wire around the support member about 5 to 9 times. Thus, an inductor coil comprising about 5 to 9 turns may be formed. In one example, a first inductor coil is formed which has about 6 to 7 turns, such as about 6.75 turns. Accordingly, winding the litz wire comprises winding the litz wire around the support member about 6 to 7 times, such as about 6.75 times. In another example, a second inductor coil is formed which has about 8 to 9 turns, such as about 8.75 turns. Accordingly, winding the litz wire comprises winding the litz wire around the support member about 8 to 9 times, such as about 8.75 times. A turn is one complete rotation around an axis.

The litz wire may have a lay direction and forming the inductor coil may comprise winding the litz wire in a same direction as the lay direction. Accordingly, the lay direction compliments the winding direction, which means that the wire strands within the litz wire are less likely to twist and unravel.

The bondable coating may comprise enamel.

In one example the individual wires are Thermobond™ STP18 wires, commercially available from Elektrisola Inc., New Hampshire. These wires have been found to provide a good suitability for use in an aerosol provision device. For example, these wires have a relatively high bonding temperature such that the heated susceptor in the device does not cause the bondable coating to re-soften.

In the second aspect, an aerosol provision device induction coil is formed from a litz wire comprising a plurality of wire strands, each of the wire strands having a bondable coating, wherein the bondable coating has been activated such that the aerosol provision device induction coil substantially retains its own shape in the absence of a support member.

The induction coil may have a connection portion at one end, and the connection portion is coated in solder in electrical contact with substantially all the wire strands of the litz wire.

The above described method can be repeated to form a second inductor coil for the aerosol provision device. In one example method, a first inductor coil is formed, and a second inductor coil is formed, where the first inductor coil has a length that is shorter than the second inductor coil. In a particular example, forming the first inductor coil comprises winding a first litz wire around the support member over a first length thereby to form a first helical inductor coil, and forming the second inductor coil comprises winding a second litz wire around the support member over a second length thereby to form a second helical inductor coil, where the first length is shorter than the second length.

The first length (of the first inductor coil) may be between about 15 mm and about 20 mm, and the second length (of the second inductor coil) may be between about 25 mm and about 30 mm. More particularly, the first length may be about 19 mm (±1 mm) and the second length may be about 28 mm (±1 mm). It has been found that these lengths are suitable for providing effective heating of the susceptor, while reducing hot puff.

The first inductor coil may comprise a first litz wire which has a length between about 250 mm and about 300 mm, and the second inductor coil may comprise a second litz wire which has a length between about 400 mm and about 450 mm. In other words, the length of the wire within each coil is the length when the coil is unraveled. For example, the first litz wire may have a length between about 280 mm and about 290 mm, and the second litz wire may have a length between about 415 mm and about 425 mm. In a particular arrangement, the first litz wire has a length of about 285 mm, and the second litz wire has a length of about 420 mm. It has been found that these lengths are suitable for providing effective heating of the susceptor, while reducing hot puff.

The first inductor coil may comprise gaps between successive turns and each gap may have a length of about 0.9 mm. The second inductor coil may comprise gaps between successive turns and each gap may have a length of about 1 mm. This means that the heating effect of the susceptor arrangement can be different for each inductor coil. More generally, the gaps between successive turns may be different for each inductor coil. The gap length is measured in a direction parallel to the longitudinal axis of the device/susceptor. A gap is a portion where no wire of the coil is present (e.g., there is a space between successive turns).

The first inductor coil may have a mass between about 2 g and about 3 g, and the second inductor coil may have a mass between about 3 g and about 4 g. For example, the first mass may be less than about 3 g, or less than about 2.5 g, and the second mass may be greater than about 3 g, or greater than about 3.5 g. In a particular arrangement, the first inductor coil has a mass of about 2.4 g and the second inductor coil has a mass of about 3.5 g.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the lid 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

Figure 2:
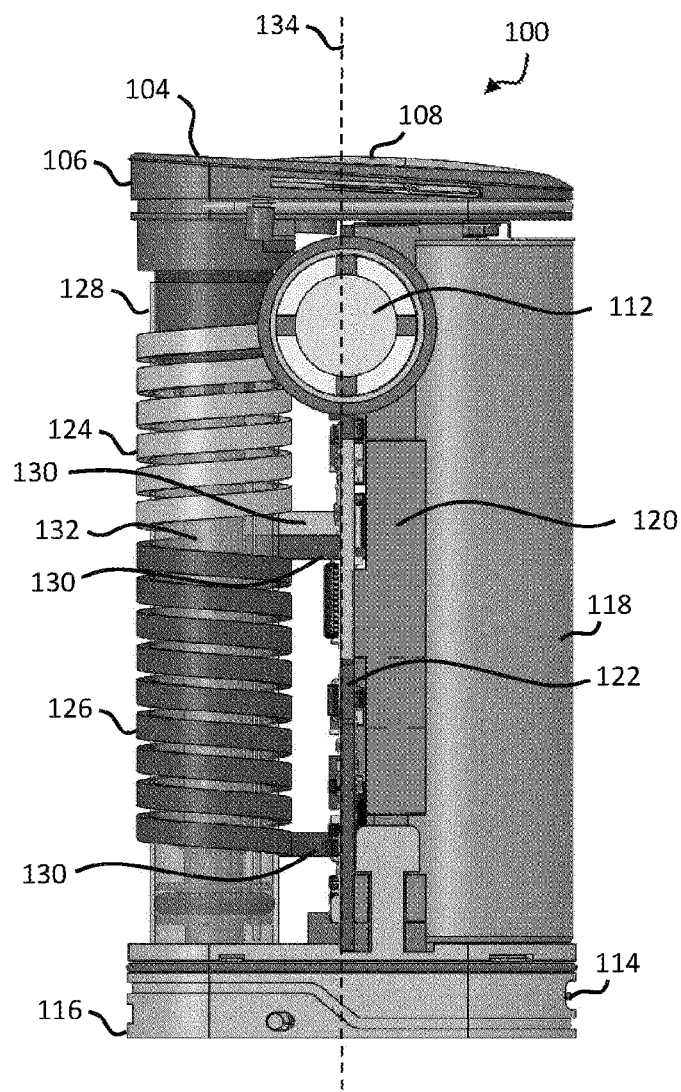
FIG. 2 shows a front view of the aerosol provision device of FIG. 1 with an outer cover removed.
Figure 3:
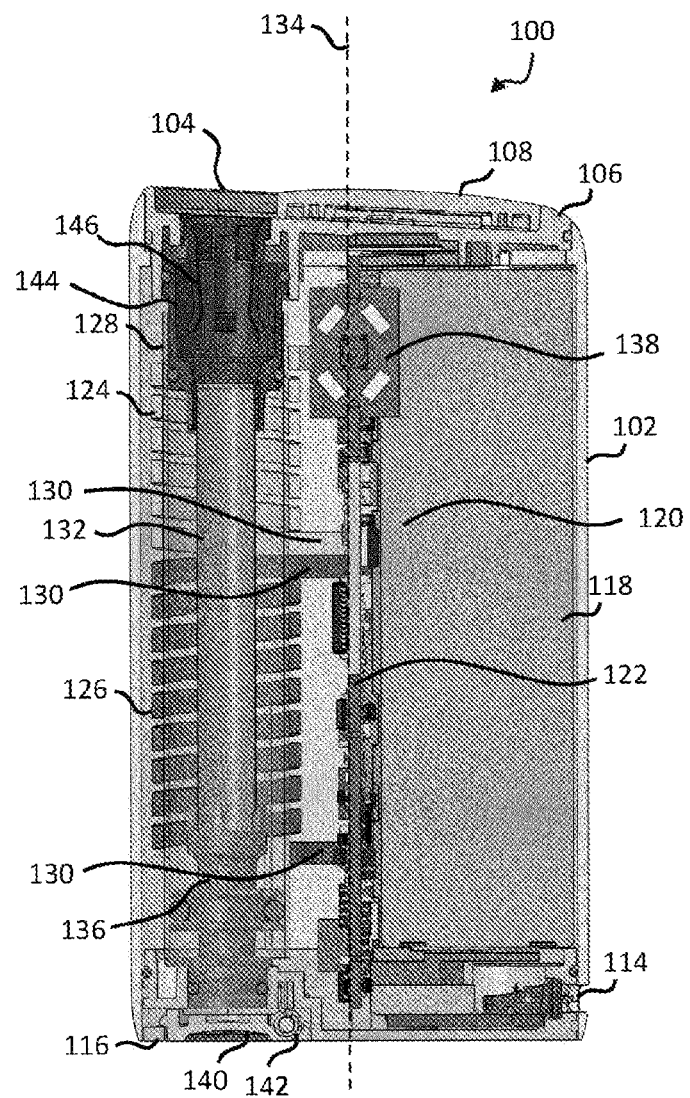
FIG. 3 shows a cross-sectional view of the aerosol provision device of FIG. 1.
Figure 4:
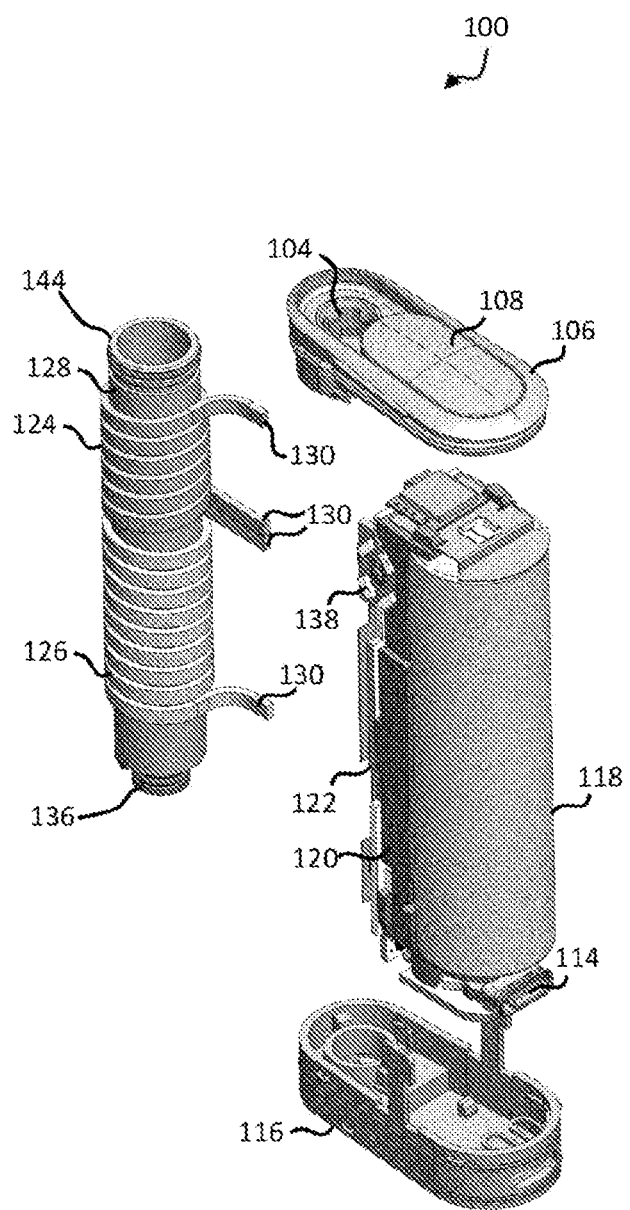
FIG. 4 shows an exploded view of the aerosol provision device of FIG. 2.
Figures 5A, 5B:
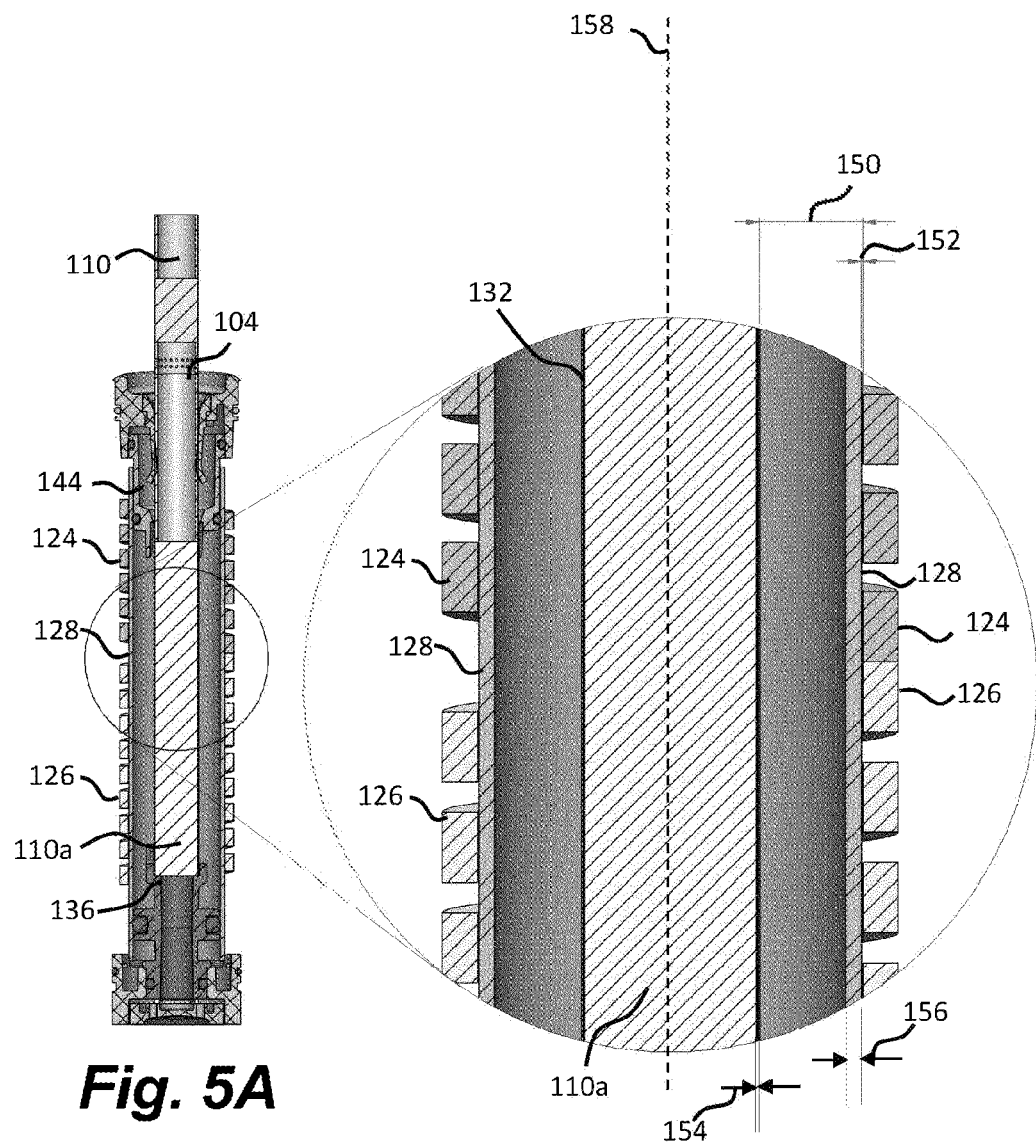
FIG. 5A shows a cross-sectional view of a heating assembly within an aerosol provision device.
FIG. 5B shows a close-up view of a portion of the heating assembly of FIG. 5A.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100. The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, e.g., by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

FIG. 4 is an exploded view of the device 100 of FIG. 1, with the outer cover 102 omitted.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

FIG. 6 depicts part of the heating assembly of the device 100. As briefly mentioned above, the heating assembly comprises a first inductor coil 124 and a second inductor coil 126 arranged adjacent to each other, in the direction along an axis 200. The inductor coils 124, 126 helically extend around the insulating member 128. The susceptor 132 is arranged within the tubular insulating member 128. In this example, the wires forming the first and second inductor coils have a circular cross section, however they may have a different shape cross section, such as a rectangular cross section.

The axis 200 may be defined by one, or both, of the inductor coils 124, 126 for example. The axis 200 is parallel to the longitudinal axis 134 of the device 100, and is parallel to the longitudinal axis of the susceptor 158. Each inductor coil 124, 126 therefore extends around the axis 200. Alternatively, the axis 200 may be defined by the insulating member 128 or susceptor 132.

In use, the first inductor coil 124 is operated initially. This causes a first section of the susceptor 132 to heat up (e.g., the section of the susceptor 132 surrounded by the first inductor coil 124), which in turn heats a first portion of the aerosol generating material. At a later time, the first inductor coil 124 may be switched off, and the second inductor coil 126 may be operated. This causes a second section of the susceptor 132 to heat up (e.g., the section of the susceptor 132 surrounded by the second inductor coil 126), which in turn heats a second portion of the aerosol generating material. The second inductor coil 126 may be switched on while the first inductor coil 124 is being operated, and the first inductor coil 124 may switch off while the second inductor coil 126 continues to operate. Alternatively, the first inductor coil 124 may be switched off before the second inductor coil 126 is switched on. A controller can control when each inductor coil is operated/energised.

In some examples, the length 202 of the first inductor coil 124 is shorter than the length 204 of the second inductor coil 126. The length of each inductor coil is measured in a direction parallel to the axis 200 of the inductor coils 124, 126. The first, shorter inductor coil 124 may be arranged closer to the mouth end (proximal end) of the device 100 than the second inductor coil 126. When the aerosol generating material is heated, aerosol is released. When a user inhales, the aerosol is drawn towards the mouth end of the device 100, in the direction of arrow 206. The aerosol exits the device 100 via the opening/mouthpiece 104, and is inhaled by the user. The first inductor coil 124 is arranged closer to the opening 104 than the second inductor coil 126.

In this example, the first inductor coil 124 has a length 202 of about 20 mm, and the second inductor coil 126 has a length 204 of about 30 mm. A first wire, which is helically wound to form the first inductor coil 124, has an unwound length of about 285 mm. A second wire, which is helically wound to form the second inductor coil 126, has an unwound length of about 420 mm.

Each inductor coil 124, 126 is formed from litz wire comprising a plurality of wire strands. For example, there may be between about 50 and about 150 wire strands in each litz wire. In the present example, there are about 75 wire strands in each litz wire. In some examples, the wire strands are grouped into two or more bundles, where each bundle comprises a number of wire strands such that the wire strands in all bundles add up to the total number of wire strands. In the present example there are 5 bundles of 15 wire strands.

Each of the wire strands have a diameter. For example, the diameter may be between about 0.05 mm and about 0.2 mm. In some examples, the diameter is between 34 AWG (0.16 mm) and 40 AWG (0.0799 mm), where AWG is the American Wire Gauge. In this example, each of the wire strands have a diameter of 38 AWG (0.101 mm). The litz wire may therefore have a radius of between about 1 mm and about 2 mm. In this example, the litz wire has a radius of between about 1.3 mm and about 1.4 mm.

Figure 6:
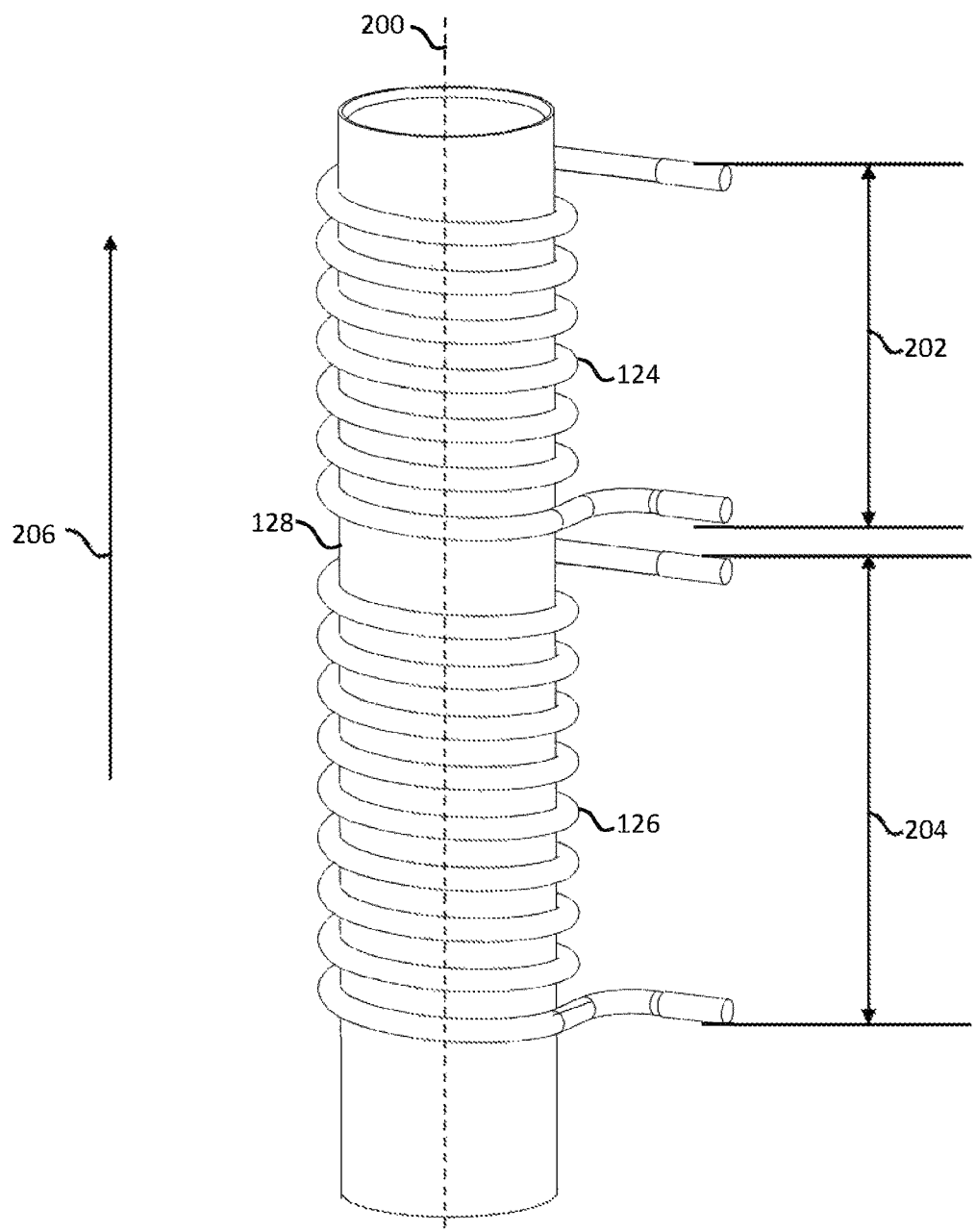
FIG. 6 shows a perspective view of first and second inductor coils wrapped around an insulating member.

As shown in FIG. 6, the litz wire of the first inductor coil 124 is wrapped around the axis 202 about 6.75 times, and the litz wire of the second inductor coil 126 is wrapped around the axis 202 about 8.75 times. The litz wires do not form a whole number of turns because some ends of the litz wire are bent away from the surface of the insulating member 128 before a full turn is completed (see FIG. 10, for example).

FIG. 6 shows gaps between successive windings/turns. These gaps may be between about 0.5 mm and about 2 mm, for example.

In some examples, each inductor coil 124, 126 has the same pitch, where the pitch is the length of the inductor coil (measured along the axis 200 of the inductor coil or along the longitudinal axis 158 of the susceptor) over one complete winding. In other examples each inductor coil 124, 126 has a different pitch.

In this example, the first inductor coil 124 has a mass of about 1.4 g, and the second inductor coil 126 has a mass of about 2.1 g.

In one example the inner diameter of the first and second inductor coils 124, 224, 224, 226 is about 12 mm in length, and the outer diameter is about 14.3 mm in length.

Figure 7:
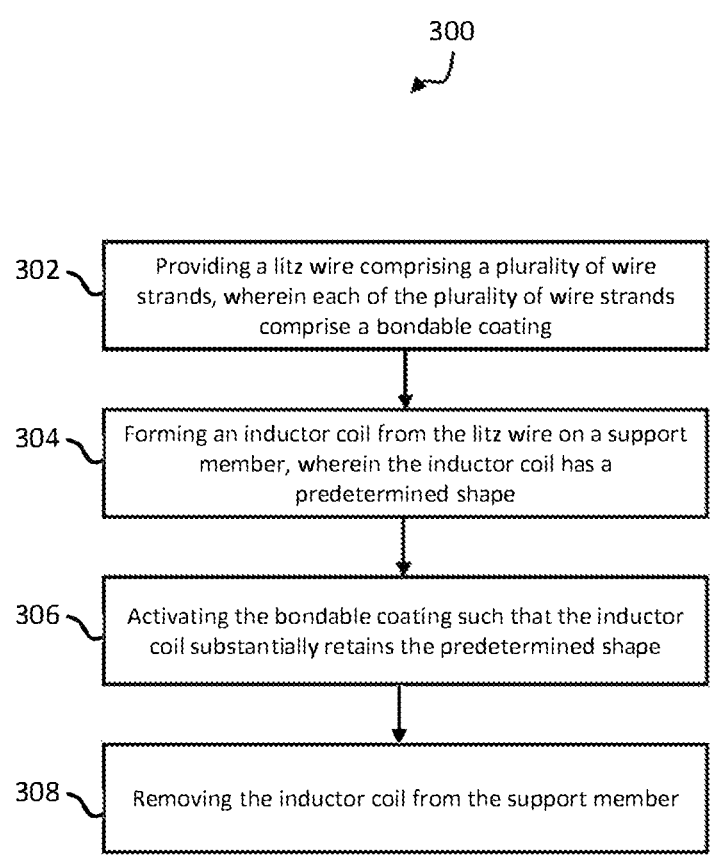
FIG. 7 shows a flow diagram of an example method of forming an inductor coil.

FIG. 7 depicts a flow diagram of a method 300 for forming an aerosol provision device inductor coil. Such a method can be used to form one, or both, of the inductor coils 124, 126 described in relation to FIGS. 2-6.

The method comprises, in block 302, providing a litz wire comprising a plurality of wire strands, wherein each of the plurality of wire strands comprises a bondable coating. For example, a litz wire with parameters described above may be provided.

Figure 8:
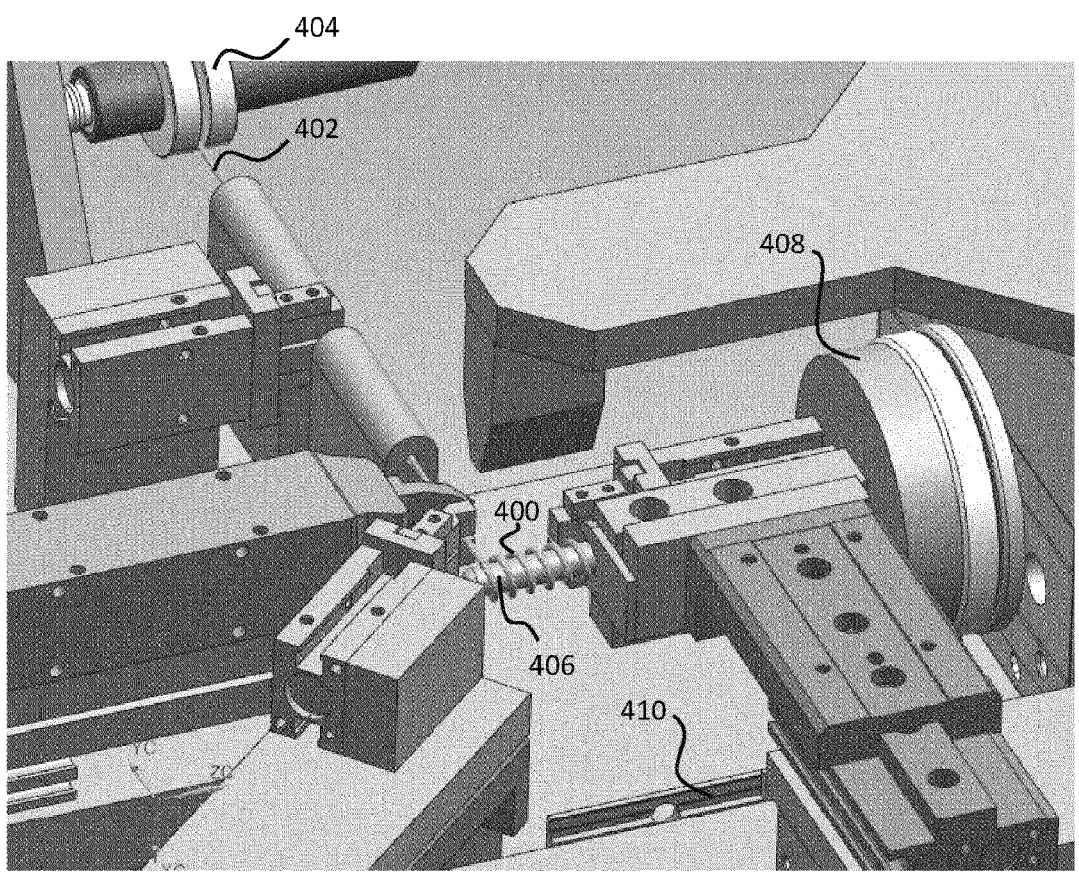
FIG. 8 shows a perspective view of manufacturing equipment used to form an inductor coil.

The method comprises, in block 304, forming an inductor coil from the litz wire on a support member, wherein the inductor coil has a predetermined shape. FIG. 8 depicts example machinery used to form an inductor coil 400 from litz wire. As shown, litz wire 402 may be initially wound around a bobbin 404 before being unraveled and wound around a support member 406. In this example, a drum 408 is rotated and moved parallel to a guide rail 410 which causes the litz wire to be helically wound along the length of the support member 406. The speed at which the drum 408 rotates and moves along the guide rail 410 dictates the spacing/gap size between adjacent turns on the inductor coil 400. To form a longer inductor coil 400, the drum 408 can move further along the guide rail 410 (while continuing to rotate). To form an inductor coil 400 with a greater number of turns, the drum 408 can rotate a greater number of times.

The support member 406 has a diameter which substantially corresponds to a diameter of the insulating member 128. The support member 406 therefore has an outer cross-section which corresponds to the outer cross-section of the insulating member 128. As the litz wire 402 is wound around the support member 406, an inductor coil 400 with a predetermined shape is formed. The support member 406 therefore at least partially defines the shape of the inductor coil 400. An inner cross section of the inductor coil 400 is therefore substantially the same as the outer cross section of the support member 406. In this example, the support member 406 has a diameter of about 12 mm. The litz wire has a diameter of about 1.3 mm, such that the outer diameter of the inductor coil is about 14.6 mm. Inductor coils with different dimensions can be formed in the same way.

Once the inductor coil 400 is formed with the desired shape, the method further comprises, in block 306, activating the bondable coating such that the inductor coil 400 substantially retains the predetermined shape. In the present example the litz wire has an enamel bondable coating, and is activated via heating. Accordingly, while the inductor coil 400 remains on the support member 406, heat is applied to the inductor coil 400. In the present example, heated air is moved over the inductor coil 400. For example, air is heated to an activation temperature suitable to cause the bondable coating to activate, and is blown across the inductor coil 400 via a fan or air gun. In one example the activation temperature is about 190 degrees Celsius. The heat causes the bondable coating to activate, such that the viscosity of the bondable coating becomes lower. After a predetermined period of time, the application of heat is stopped, and the bondable coating begins to cool. In some examples the cooling process can be accelerated by the application of cool air. For example, an air gun or fan can cause cooled/ambient air to flow across the inductor coil. As the temperature of the bondable coating lowers, the viscosity of the bondable coating becomes higher again. This causes the individual wire strands within the litz wire bond to each other. In another example, the bondable coating can be activated via contact with a solvent.

After the bondable coating has been activated, the method further comprises, in block 308, removing the inductor coil from the support member 406. The bonding process means that the inductor coil 400 substantially retains its predetermined shape even after it is removed from the support member 406. To facilitate removal from the support member, it may be formed from or coated with a material to which the inductor coil does not adhere strongly, so that the coil is not also bonded to the support during the heating process. The support member may be made of metal, for example.

The litz wire stored on the bobbin 404 may have a particular lay direction. That is, the individual strands of wire within the litz wire are twisted in a particular direction. For example, the wire strands may have a left-hand lay direction or a right-hand lay direction. Preferably, the litz wire has a lay direction which corresponds to the winding direction of the litz wire onto the support member 406. For example, litz wire with a right-hand lay direction should be used for an inductor coil which is wound in the right-handed sense. Litz wire with a left-hand lay direction should be used for an inductor coil which is wound in the left-handed sense. It has been found that this arrangement stops the wire strands from unravelling and means that the inductor coil more closely conforms to the outer surface of the insulating member 128.

Inductor coils of other shapes can be formed in substantially the same way. For example, a flat inductor coil can be formed by winding the litz wire in a spiral, while being supported by a suitably shaped support member.

Once the inductor coil 400 has been formed and removed from the support member 406, the inductor coil 400 can be assembled in the device 100. The method may therefore further comprise receiving the inductor coil 400 on the insulating member 128. For example, the inductor coil 400 can be slid onto the insulating member 128. From here, the inductor coil 400 can be connected to a source of electric power within the device 100.

Figure 9:
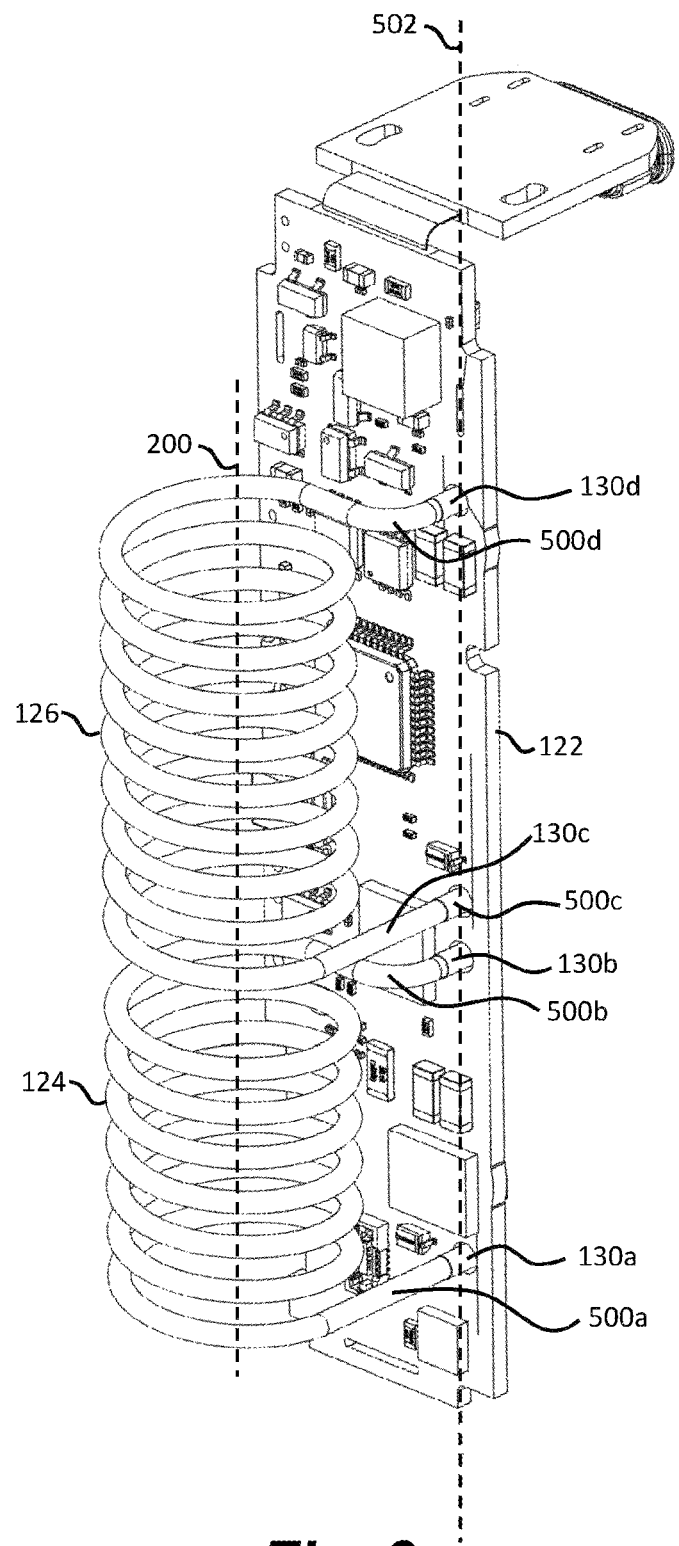
FIG. 9 shows a perspective view of first and second inductor coils connected to a printed circuit board.

FIG. 9 depicts the first and second inductor coils 124, 126 connected to a printed circuit board (PCB) 122. The first inductor coil 124 comprises a first connection portion 500a towards a first end 130a of the first inductor coil 124. The first connection portion 500a therefore comprises the first end 130a. The connection portion 500a forms an electrical connection with the PCB 122 such that the inductor coil 124 can receive electrical power. The first inductor coil 124 also comprises a second connection portion 500b towards a second end 130b of the first inductor coil 124. The second connection portion 500b therefore comprises the second end 130b. The second connection portion 500b also forms an electrical connection with the PCB 122. In some examples, any part of the connection portions 500a, 500b can be electrically connected to the PCB 122, rather than the ends 130a, 130b.

Similarly, the second inductor coil 126 comprises a first connection portion 500c towards a first end 130c of the second inductor coil 126. The first connection portion 500c therefore comprises the first end 130c. The first connection portion 500c forms an electrical connection with the PCB 122 such that the inductor coil 126 can receive electrical power. The second inductor coil 126 also comprises a second connection portion 500d towards a second end 130d of the second inductor coil 126. The second connection portion 500d therefore comprises the second end 130d. The second connection portion 500d also forms an electrical connection with the PCB 122. In some examples, any part of the connection portions 500c, 500d can be electrically connected to the PCB 122, rather than the ends 130c, 130d.

Each inductor coil 124, 126 therefore comprises a connection portion arranged at each end. In general, the connection portion is defined as part of the inductor coil which forms an electrical connection with a source of electric power. More particularly, the connection portion comprises an end of the inductor coil.

Figure 10:
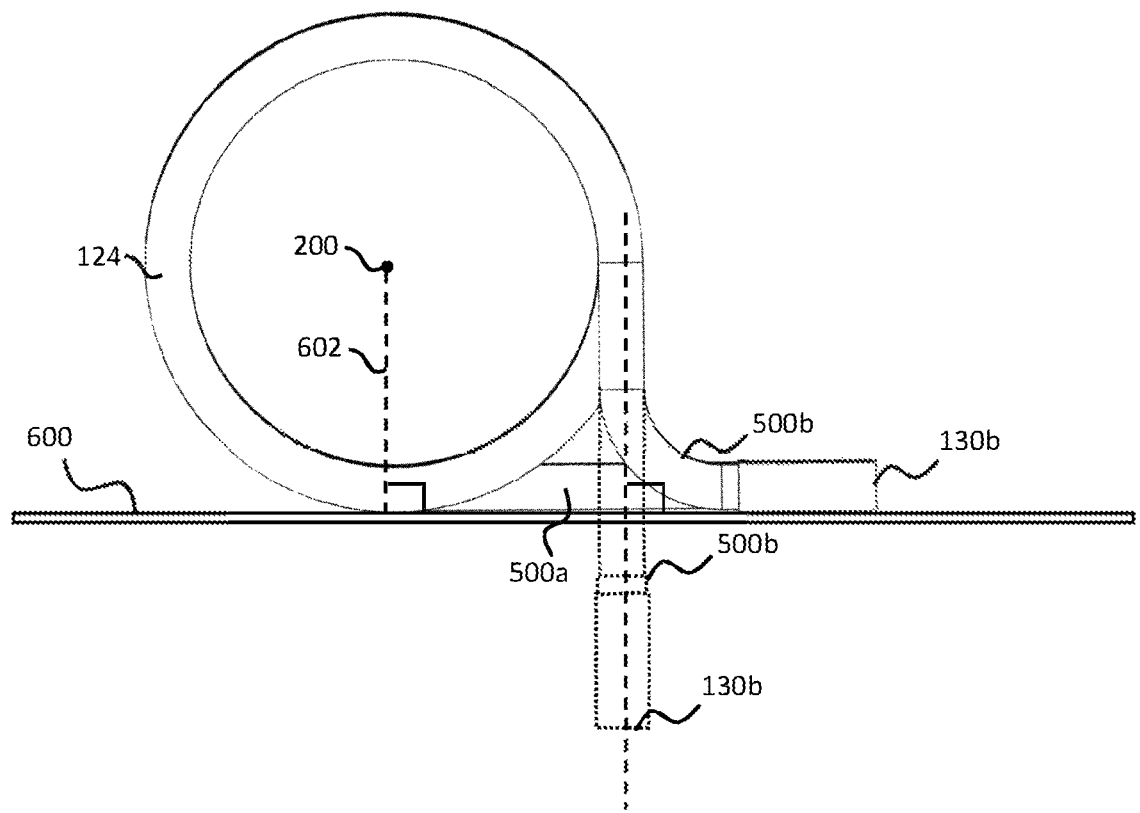
FIG. 10 shows a top-down view of an inductor coil.

As shown in FIG. 9, each inductor coil 124, 126 comprises two connection portions, each arranged at an end of the inductor coil. The shape of the inductor coil 124, 126 is therefore partially dictated by the connection portions. FIG. 10 depicts a top down view of the first and second inductor coils 124, 126, where the first inductor coil 124 is located at the top.

As shown, both connection portions of each inductor coil 124, 126 lie in substantially the same plane 600. Thus, as shown in FIG. 9, the first and second ends of each inductor coil 124, 126 lie/terminate on an axis 502 that is parallel to the axis 200 defined by the inductor coils. The plane 600 is arranged such that it is arranged tangentially to inductor coils 124, 126 such that an angle of 90 degrees is subtended between the plane 600 and the radius 602 of the inductor coil 124 at the point the plane 602 forms a tangent with the inductor coil 124.

Preferably, the method at block 304 comprises bending at least one of the connection portions such that it lies in the same plane as the other connection portion. The dashed lines in FIG. 10 depicts the second connection portion 500b of the first inductor coil 124 before it is bent into position. In this initial position, the second connection portion 500b extends tangentially away from the helical portion of the inductor coil 124. To form the inductor coil 124, the connection portion 500b is bent by about 90 degrees such that the second end 130b is in the same plane as the first end 130a. The solid lines in FIG. 10 shows the second connection portion 500b after it has been bent into position. In this example, the first connection portion 500a is not bent, and extends tangentially from the helical portion of the inductor coil 124. By forming the inductor coils 124, 126 in this way, the ends of the inductor coils 124, 126 can be more easily connected to the PCB 122.

As mentioned, the connection portion allows the inductor coil to be connected to a source of electrical power (via the PCB 122, for example). To form a suitable electrical contact, the method further comprises submerging/dipping the connection portion into solder for a period of time. For example, the ends of the inductor coil are dipped into the solder. The molten solder acts to melt or otherwise remove the insulation from the plurality of wire strands in the litz cable, therefore creating a point for good electrical contact.

In the present example, where the litz wire comprises about 75 individual wire strands with a diameter of 38 AWG (0.101 mm), the solder should be at a temperature of about 450° C. and the connection portions should be dipped in the solder for about 4-5 seconds to ensure a good electrical contact is created. Once the connection portions have been formed, the inductor coil can be connected to the source of electrical power (such as the PCB 122).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of forming an aerosol provision device inductor coil, the method comprising:
   providing a litz wire comprising a plurality of wire strands, wherein each of the plurality of wire strands comprise a bondable coating;
   forming an inductor coil from the litz wire on a support member, wherein the inductor coil has a predetermined shape;
   activating the bondable coating such that the inductor coil substantially retains the predetermined shape; and
   removing the inductor coil from the support member.

2. The method according to claim 1, wherein the forming an inductor coil comprises winding the litz wire around the support member thereby to form a helical inductor coil.

3. The method according to claim 1, wherein the predetermined shape includes a connection portion at one or more ends of the inductor coil, for connecting the inductor coil to a source of electric power, the method comprising:
dipping the connection portion into solder for a period of time.

4. The method according to claim 3, wherein the period of time is between about 2 seconds and about 6 seconds.

5. The method according to claim 3, wherein the solder has a temperature between about 400° C. and about 500° C.

6. The method according to claim 1, wherein the activating the bondable coating comprises heating the bondable coating.

7. The method according to claim 6, comprising cooling the inductor coil after the activating the bondable coating.

8. The method according to claim 1, wherein the predetermined shape comprises two connection portions, both of which lie in substantially the same plane, and wherein the forming comprises bending at least one of the connection portions such that it lies in the plane.

9. The method according to claim 8, wherein the bending comprises bending by about 90 degrees.

10. The method according to claim 1, wherein winding the litz wire comprises winding the litz wire around the support member about 5-9 times.

11. The method according to claim 1, wherein the litz wire has a lay direction and the forming comprises winding the litz wire in a same direction as the lay direction.

12. The method according to claim 1, wherein the bondable coating comprises enamel.

13. An aerosol provision device induction coil formed from a litz wire comprising a plurality of wire strands, each of the wire strands having a bondable coating, wherein the bondable coating has been activated such that the aerosol provision device induction coil substantially retains its own shape in the absence of a support member.

14. The aerosol provision device induction coil according to claim 13, wherein the induction coil has a connection portion at one end, the connection portion coated in solder in electrical contact with substantially all the wire strands of the litz wire.

15. An aerosol provision system, comprising:

an aerosol provision device according to claim 13; and an article comprising aerosol generating material.

16. The aerosol provision system of claim 15, wherein the induction coil has a connection portion at one end, the connection portion coated in solder in electrical contact with substantially all the wire strands of the litz wire.

* * * * *